ize Patent [19]

Rutenberg et al.

[11] 4,269,975
[45] May 26, 1981

[54] PREPARATION OF GUAR GUM

[75] Inventors: Morton W. Rutenberg, North Plainfield; Thomas R. Molnar, Edison, both of N.J.

[73] Assignee: National Starch and Chemical Corporation, Bridgewater, N.J.

[21] Appl. No.: 129,141

[22] Filed: Mar. 10, 1980

[51] Int. Cl.³ .................... C08B 37/00; C07G 17/00
[52] U.S. Cl. ........................... 536/114; 252/8.55 R
[58] Field of Search ..................................... 536/114

[56] References Cited

U.S. PATENT DOCUMENTS

| 2,891,050 | 6/1959 | Elverum | 536/114 |
|---|---|---|---|
| 3,415,927 | 10/1968 | Butensky et al. | 536/114 |
| 3,455,899 | 7/1969 | Keen | 536/114 |
| 3,855,149 | 12/1974 | Bielskis | 536/114 |

FOREIGN PATENT DOCUMENTS 906327  9/1962  United Kingdom .

OTHER PUBLICATIONS

Tookey, H., et al., Agricultural and Food Chemistry, vol. 11, No. 4, pp. 317-321, 1963.
Sikka, K., et al., Research and Industry, vol. 14, pp. 138-139, 1969.

Primary Examiner—Johnnie R. Brown
Assistant Examiner—Blondel Hazel
Attorney, Agent, or Firm—Edwin M. Szala; Margaret B. Kelley

[57] ABSTRACT

Guar gum is prepared by hydrating guar splits with sufficient water to provide a total moisture content of 25-80%, extruding the hydrated splits, and grinding them, while wet, preferably to a finely divided state. For most uses the ground gum is then dried, preferably in a flash dryer. Typically the hydration is carried out at 5°-95° C. for at least ¼ hour; the preferred conditions are 20°-80° C. for 0.5 to 2 hours. The extrusion is conveniently carried out in an extruder provided with a rotatable screw for transporting and working the hydrated splits. Typically grinding is carried out in a hammermill.

10 Claims, No Drawings

PREPARATION OF GUAR GUM

BACKGROUND OF THE INVENTION

This invention relates to a new and improved process for preparing guar gum, especially finely divided, high viscosity guar gum.

Guar gum has diverse industrial uses including its use as a thickener and/or stabilizer in the textile, food, cosmetic and pharmaceutical industries. It is also used as a beater additive for paper and as a fluid loss control agent and flocculant in oil well drilling muds.

As used herein the term "guar gum," often called guar flour after grinding, refers to the mucilage found in the seed of the leguminous plant Cyamopsis tetragonoloba. Guar seeds are composed of a pair of tough, non-brittle endosperm sections, hereafter referred to as "guar splits," between which is sandwiched the brittle embryo (germ). The entire structure is enclosed in a tough seedcoat (hull) (14–17% of the seed) which is generally removed by passing the seeds rapidly through heat and then subjecting them to a pearling operation, wherein the components of the seed are separated by multi-stage grinding and sifting operations. After dehulling, the seeds are split, the germ (43–47% of the seed) is removed by screening, and the splits are ground to provide the gum. The gum is present in the splits contained in tiny cells having a water-insoluble cell wall. The gum in these cells is rather slowly dispersible in water, and accordingly it is desirable to disrupt the cell wall as well as to obtain a fine particle size.

The splits are reported to contain about 78–82% galactomannan polysaccharide and minor amounts of some proteinaceous material, inorganic salts, water-insoluble gum, and cell membranes, as well as some residual seedcoat and embryo. They are tough and extremely difficult to grind. Hence, several wet milling and extraction processes have been suggested for the recovery of the gum from the splits.

U.S. Pat. No. 2,891,050 describes one such process which involves tempering (hydrating) guar splits until they have a moisture content of 30–60% by weight of water, flattening (flaking) the wet splits into thin flakes by passing them between rolls, and then drying and grinding them. The flakes may be ground prior to drying or may be used without grinding.

U.S. Pat. No. 3,455,899 describes a process for producing a low odor, low taste galactomannan gum by treating the splits with steam at about 90°–100° C. for up to 1 hour after the splits have reached the temperature of the steam. The splits are subsequently tempered, flattened, dried, and ground. The steam treatment may be conducted simultaneously with the tempering.

British Pat. No. 906,327 describes a process for extracting galactomannan polysaccharide from guar seeds, preferably the guar seed flakes obtained by crushing the seeds. The flakes or seeds are subjected to the action of an aqueous caustic alkali at 60°–120° C. in the presence of a salt which retards swelling of the polysaccharide. The gum may be separated by centrifugation.

Another extraction process is described in an article entitled "Mannose-Containing Polysaccharides: A Method for The Extraction and Estimation of Gum of Guar (Cyamopsis tetragonolba L. Taub)" by K. C. Sikka and R. P. Johari (Research and Industry, Vol 14, pp. 138–139, July-Sept. 1969). Seed endosperm, previously ground to pass a 40 mesh sieve, is extracted with water at 70°–80° C. for 30 minutes and the solids are separated from the extract by centrifuging. The supernatant extract obtained after repeated extraction and centrifugation is poured into ethanol to precipitate the gum.

The above processes generally do not give the desired high viscosity guar gum. Hence, it is an object of this invention to provide a rapid, facile process which will produce guar gum, especially a finely divided, high viscosity guar gum.

SUMMARY OF THE INVENTION

The above object is achieved by hydrating guar splits with sufficient water to provide a moisture content of about 25 to 80% by weight, preferably 50 to 60%, extruding the hydrated splits, and grinding them without prior drying. The resulting gums are generally dried. The extrusion step may be conveniently carried out in an extruder without external heating.

DESCRIPTION OF THE PREFERRED EMBODIMENTS

As used herein, the term "dry splits" refers to commercially dry guar splits which contain about 8-10% moisture. They may contain greater or lesser amounts of adhering hull material, the better quality having the lesser amount of adhering hull.

In the first step of this invention, the isolated guar splits, mainly dehulled, are hydrated with from about 25 to 300% by weight of water, based on the weight of commercially dry splits. Preferably the splits are hydrated with 75–125% by weight of water. The hydrated splits should have a total moisture content of about 25 to 80%, preferably about 50 to 60%, by weight before extrusion. The total moisture content consists of the water absorbed by the splits during the hydration step plus the water normally present in the commercially dry splits.

Any hydration method which will provide the desired moisture content is suitable for use in the process of this invention. One such method involves pouring the water on the splits or adding the splits directly to the water and then agitating the splits continuously or intermittently until all the free water is absorbed. Another method involves spraying the agitated splits with a fine mist using an air pressure controlled atomizer. The splits absorb the water over a period of time. After all the water is absorbed, the swollen splits remain as discrete particles which can be conveyed.

The hydration step is generally carried out at ambient temperature. However, it may be possible to carry it out at temperatures of from 5°–95° C., preferably at 20°–80° C. Excessive heating should be avoided as it reduces the viscosity-producing properties of the final gum. If heating is desired, the water may be preheated or a mixer fitted with a heated water jacket may be used. Direct steam injection may also be used to heat the hydrated splits.

The hydration time will vary depending upon the amount of water used, the temperature, and the condition of the splits. When using the preferred amount of water (i.e. 75–125% by weight on the dry splits), hydration times are at least 15 minutes at room temperature, preferably 30 minutes to 2 hours. It is generally desirable to hold the splits for a period of time ranging from 30 minutes to 1 hour after all the water is absorbed. The holding period insures uniform hydration. Holding times of up to 6 hours can be tolerated; however any extensive delay in processing the hydrated splits should be avoided since it will be conducive to the growth and multiplication of microorganisms initially present in the splits, as well as the activation of enzymes which may also be present. The presence of such microorganisms is undesirable in food grade guar gum, and it is detrimental in all grades since it leads to a reduction in the viscosity, upon standing, of aqueous sols prepared therefrom.

The second step of this invention occurs in a processing unit wherein the hydrated splits are worked (i.e. mixed, compressed, and/or sheared) as they are transported through the unit. It is specifically contemplated that this function can best be achieved by using an extruder having an elongated cylindrical barrel provided with an inlet opening, a die opening at the outlet end of the barrel, and a screw, rotatable within the tightly fitted barrel, which will transport and work the material fed through the inlet opening.

In practice, various types of extruders can be used, such as a Wenger X-5 laboratory model extruder (Wenger Manufacturing Co., Sabetha, Kan., as well as a Bonnot 2¼ in. (5.72 cm) laboratory model extruder (Bonnot Manufacturing, Kent, Ohio). These extruders conform to the description above and gave good results when used in laboratory and pilot plant scale runs.

It has been found that the optimum extruder conditions can only be determined after routine experimentation and that the final operative parameters should be selected so as to give an extrudate having the desired viscosity-producing properties after grinding or grinding and drying.

A wide range of variables will affect the extrudate and they should be studied before determining the operating parameters. These include screw design, barrel design, screw speed, feed rate, die opening, etc. These affect the extrudate temperature, die pressure, and through-put rate. However, a broad range of operating parameters will yield acceptable extrudates, and the resulting gums are always higher in viscosity-producing properties than comparably processed non-extruded gums.

The extrudate should still contain the desired amount of moisture and, if it does not, the amount of water used in the hydration step should be increased to compensate for any losses due to heat build-up in the extruder or preferably the extruder should be cooled by circulating water through the hollow jacket of the barrels and/or hollow screw. While the specific modification occurring during the extrusion step is not known, the splits are distorted and disrupted and it is believed that the cell membranes are partially ruptured to give access of the gum contained therein to water, thus leading to a product which disperses and hydrates more rapidly in water. Further the extrudate is easier to grind to a finely divided state. However, there is a complex interaction between the extrusion, grinding, and drying steps which determines the viscosity of the final product.

Preferably, the wet extrudate should be ground immediately. If a high viscosity product is desired, the extrudate will be ground to a more finely divided state. Holding times of up to about 24 hours after extrusion can be tolerated; after that there is a viscosity loss in aqueous sols prepared from the held splits. The splits are generally ground in a suitable mill, as for example a hammermill such as a Raymond, Fitzmill, or Mikro-Pulverizer grinder.

The ground extrudate may be used without drying if it is to be used directly in a formulated product. Generally the ground gum will be dried to a moisture content of less than 20%, preferably 8-12%, using a rapid, but gentle, drying method such as flash drying. The time and temperature used will depend upon the drying method selected.

It can be appreciated by the practitioner that a large number of variations may be effected in hydrating, extruding, grinding, and drying the guar splits in accordance with the process procedures described above without materially departing from the scope and spirit of the invention. Such variations will be apparent to those skilled in the art and are to be included within the scope of this invention.

The following examples will more fully illustrate the embodiments of this invention. In the examples, all parts and percentages are given by weight, all temperatures are in degrees Celsius, and all viscosities are determined according to the procedure described below using 0.9% aqueous sols by weight on a dry basis (D.B.).

The moisture of the dried gum was determined using a Cenco Moisture Balance (Catalog #26675, Central Scientific Company, 2600 S. Kostner Ave., Chicago, IL. 60623; Cat. #16-3425-01, Ace Scientific Supply Co., Linden, N.J. 07036). Using the moisture content so determined, the amount of sample to yield 4.5 g (D.B.) was calculated. This amount was then added slowly to 495 ml of distilled water at 25° C. in an 1000 ml beaker while agitating with a Homogenizer Mixer (Laboratory Model 1L, Greerco Corp., Executive Drive, Hudson, NH 08051) adjusted so that the bottom of the rotor was ½ in (1.27 cm) from the bottom of the beaker and the deflector was 1 in (2.54 cm) above the rotor. The speed of the mixer was controlled by a powerstat variable transformer set to give 7300 RPM in air (2750 RPM in water). Mixing was continued for a total of 15 minutes. The sols were cooled to 25° C. in a cold water bath with intermittent stirring by hand with a spatula for a 15 min period. The viscosity of the aqueous sol was then measured at 25° C. with a Brookfield RVT Viscometer (Brookfield Engineering Laboratories, Stoughton, MA 02072) using a #5 spindle at 20 RPM, and the reading was taken after 5 rotations of the scale. The Brookfield reading was converted to centipoises (cps) by multiplying by the appropriate factor (200). Unless otherwise noted, the gum was screened through a 100 mesh screen (0.0059 in-0.01 cm) before the viscosity determination, and the fraction larger than 100 mesh was discarded. The mesh numbers used herein refer to U.S. standard sieves.

EXAMPLE I

This example describes the preparation of guar gums according to the process of this invention using a Bonnot extruder and a flash dryer. It demonstrates that high viscosity guar gums may be obtained under a wide variety of operating conditions.

Guar Gum IA was prepared by hydrating at room temperature a 100 lb (45.5 kg) batch of guar splits in a horizontal blender with a reinforced horizontal ribbon mixing blade by slowly adding 100 lb (45.5 kg) of water (100% water on splits) through two addition tubes. The hydration step was carried out in 1 hr yielding hydrated swollen splits which were then placed in the bin of an Achrison Feeder leading to the inlet part of a Bonnot 2¼ in (5.72 cm) extruder. The extruder was set up with a water-cooled compression screw, 4 water-cooled jacketed barrels, and a ⅜ in (0.95 cm) single hole die. The hydrated splits (53% moisture) were extruded at a rate equivalent to approximately 200 wet lb/hr (90.9 kg/hr) with the extruder screw running at 118 RPM. The pressure at the die was 400–425 psig; the outlet temperature was 92° C. The extrudate was then ground in a Mikro-Pulverizer hammermill (Pulverizing Machinery, 10 Chatham Road, Summit, NJ). After grinding, the gum was passed directly through a flash dryer (air inlet temperatures were 112°–132° C.). The viscosity of an aqueous sol prepared from the resulting gum (8.8% moisture) was 5280 cps compared with a viscosity of 4240 cps for an aqueous sol prepared from a control gum (12.0% moisture) processed in exactly the same way but without the extrusion step. Two additional control runs without extrusion gave gums (14.8% and 14.6% moisture) whose sols had viscosities of 4420 and 4480 cps.

A series of guar gums were prepared using the same equipment as used for Guar Gum IA with variations in the hydration conditions (Guar Gum IC was hydrated with 110% water on splits; Guar Gum IF was a 200 lb batch hydrated with 100% water on splits) and extrusion conditions (see Table I).

The viscosities of aqueous sols prepared from the resulting gums are compared in Table II, which also contains the moisture contents of the resulting dried gums.

The moisture contents of the hydrated splits used to prepare Guar Gums IC and ID were determined before and after extrusion; they were 56.1% vs. 54% and 52.8% vs. 51.5% for guar splits IC and ID, respectively.

All of the extruded splits were easier to grind than the non-extruded splits with the rates being about 650 wet lb/hr (295.4 kg/hr) for the extruded splits compared with about 400 wet lb/hr (181.8 kg/hr) for the non-extruded splits.

TABLE I

Extrusion Conditions

| Guar Gum | Screw Compression (ratio) | Screw Speed (RPM) | Die Diameter (in) | Die Pressure (psig) | Temperature (outlet) (°C.) | Rate (wet lb/hr) |
|---|---|---|---|---|---|---|
| IA | 8:1 | 118 | ⅜ | 400–425 | 92 | 200 |
| IB | 8:1 | 59 | ⅜ | 420 | 68–70 | 94 |
| IC | 8:1 | 129 | ⅜ | 375–425 | 96–101 | 200 |
| ID[a] | 8:1 | 137 | ⅜ | 360–450 | 107 | 210 |
| IE | 8:1 | 118 | ⅜ | 375 | 107–113 | 200 |
| IF | 8:1 | 120 | Slotted[b] Die | 950 | 96 | 190 |
| IG[c] | 4:1 | 120 | ⅜ | 350–375 | 129–138 | 150 |

[a] Extruder run without cooling water in the first 3 barrels
[b] 3/32 × ⅜ in. (2.4 × 19 mm)
[c] Extruder run with 5 barrels instead of 4 barrels

TABLE II

| Guar Gum (<100 mesh) | Evaluation Moisture (%) | Viscosity (cps) |
|---|---|---|
| IA | 8.8 | 5280 |
| IB | 6.8 | 5120 |
| IC | 6.8 | 5080 |
| ID | 9.0 | 5260 |
| IE | 7.0 | 5240 |
| IF | 10.6 | 5320 |
| IG | 10.4 | 5640 |

EXAMPLE II

This example describes the preparation of guar gums according to the process of this invention using a Wenger X-20 extruder and a Dietert dryer. It also compares the high viscosity guar gums of this process with a gum prepared using the conventional flattening (flaking) step of the prior art. It further shows that a variety of extruder operating conditions are suitable.

A series of guar split batches were extruded using a Wenger X-20 extruder with a 25 hp main drive, six spiral-ribbed barrels carrying single and double flight screw sections, and a 3¼ in (8.26 cm) screw. The extruder was equipped with a live bin (agitation within bin) and a horizontal feeder.

Guar Gum IIA was prepared by hydrating a 100 lb batch of guar splits with 100 lb of water (100% on splits) in a horizontal blender equipped with ribbon blades. The splits were agitated periodically over a 120 min period and then passed through the extruder (cooling water was used in the 2nd–6th heads). A portion of the extrudate was ground in a Model D Fitzmill grinder (The Fitzpatrick Co., 832 Industrial Drive, Elmhurst, IL 60126). It was dried at 93° C. for 10–15 mins in a laboratory Dietert hot air dryer (Moisture Teller #278A, Harry W. Dietert Co., 9330 Roselawn, Detroit, MI 41204).

Guar Gums IIB–OOF were hydrated, extruded (see Table III for conditions), ground, and dried as above except for IIE and IIF which were hydrated for 105 mins and 75 mins, respectively, instead of 120 mins.

The viscosities of aqueous sols prepared from the resulting gums are given in Table IV, which also includes data on the percentage passing through the 100 mesh screen.

TABLE III

| Guar Gum (<100 mesh) | Feeder Rate (RPM) | Heads Temperature (°C.) | Heads Pressure (psig) | Main Drive Speed (RPM) | Main Drive Current (amp) | Rate (wet/lb/hr) |
|---|---|---|---|---|---|---|
| IIA | 11 | 4th 41 | — | 300 | 17 | 157 |
|  |  | 5th 52 | — |  |  |  |
|  |  | 6th 89 | 350 |  |  |  |
| IIB | 17 | 4th 43 | — | 305 | 19 | 200 |
|  |  | 5th 56 | — |  |  |  |
|  |  | 6th 88 | 375 |  |  |  |
| IIC[a] | 17 | 4th 53 | — | 305 | 20 | 210 |
|  |  | 5th 57 | — |  |  |  |
|  |  | 6th 89 | 345 |  |  |  |
| IID[b] | 17 | 4th 44 | — | 305 | 19 | 234 |
|  |  | 5th 59 | — |  |  |  |
|  |  | 6th 77 | 300 |  |  |  |
| IIE[c] | 17 | 4th 46 | — | 300 | 21 | 220 |
|  |  | 5th 57 | — |  |  |  |
|  |  | 6th 78 | 400 |  |  |  |
| IIF[d] | 16 | 4th 46 | — | 300 | 21 | 195 |
|  |  | 5th 64 | — |  |  |  |
|  |  | 6th 98–104 | 530–580 |  |  |  |

[a] Extruder run with cooling water shut off on all barrels except 6th
[b] Extruder fitted with a die having 2 holes of ⅜ in (0.95 cm) diameter
[c] Extruder fitted with a die having 25 holes of ⅛ in (0.32 cm) diameter
[d] Extruder fitted with a die having 90 holes of 1/16 in (0.16 cm) diameter

TABLE IV

| Guar Gum (<100 mesh) | Evaluation Viscosity (cps) | % through 100 mesh |
|---|---|---|
| IIA | 5220 | 47 |
| IIB | 4480 | — |
| IIC | 5000 | 78 |
| IID | 5600 | 35 |
| IIE | 4560 | — |
| IIF | 4800 | 58 |

A comparison batch of guar splits (100 lb hydrated with 100 lb of water over 90 mins) was passed through a set of Allis-Chalmers flaker rolls (2×36 in diameter rolls running at 100 RPM and 1000 psig). The flattened splits were ground and dried in the same manner as Guar Gums IIA–IIF. The viscosity of an aqueous sol prepared from the resulting gum was 3940 cps.

A control batch of guar splits (non-flattened and non-extruded) could not be ground directly through the 40 mesh screen of the Fitzmill grinder but had to be ground first through the Fitzmill fitted with a 20 mesh screen (0.033 in-0.084 cm) and then through the 40 mesh (0.0165 in-0.042 cm) screen. The viscosity of an aqueous sol prepared from the resulting gum was 3240 cps. A comparison batch (flattened as above, but passed through the 20 and 40 mesh screen as was the control batch) had a slightly higher viscosity of 3680 cps.

The results show that, although the use of flattening (flaker) rolls gives a gum with higher viscosity-producing properties than gum prepared without the flattening rolls, the use of an extruder under the same operational conditions gives gums with much higher viscosity-producing properties.

EXAMPLE III

This example describes the preparation of guar gums according to the process of this invention using a Wenger X-5 laboratory model extruder. It further demonstrates the effect of varying the time, temperature, and water content during the hydration step on the viscosity-producing properties and the ease of grinding the extrudate. It also provides a comparison between extruded and non-extruded gums similarly processed using varied hydration conditions (time, temperature, and % water on splits).

A series of 400 g guar split batches were agitated with from 15 to 300% water by weight, based on the dry splits, at from 5° to 95° C. for from 15 minutes to 6 hours.

The hydrated splits were extruded using the Wenger X-5 laboratory model extruder having a configuration consisting of a 1 in (2.54 cm) diameter screw being 15 in (38.10 cm) in length with a 3 in (7.62 cm) single flight feed section followed by 7 double flight screw sections with steam locks between each section (a total of 7). The extruder barrel was in 8 sections with the section at the feed inlet having spiral grooves, followed by 3 spiral, 3 straight, and 1 spiral grooved section leading to the outlet end which was fitted with a 0.2 in (0.5 cm) die. Cooling water was circulated through all the barrels.

The extrudate was ground using a Mikro-Pulverizer Bantam hammermill and dried as in Example II using the Dietert hot air dryer.

The viscosities of aqueous sols prepared from the resulting gums are given in Tables V, VI, and VII.

TABLE V

| Hydration Conditions | | | Guar Gum Evaluation | | |
| --- | --- | --- | --- | --- | --- |
| Water (% on splits) | Time (hr) | Temperature (°C.) | Through 100 Mesh (%) | Moisture Content (%) | Viscosity (cps) |
| 100 | 0.25 | 24 | 68 | 2.0 | 4120 |
| 100 | 0.5 | 24 | 82 | 7.4 | 4400 |
| 100 | 1.0 | 24 | 74 | 6.2 | 4920 |
| 100 | 2.0 | 24 | 71 | 3.8 | 4580 |
| 100 | 4.0 | 24 | 71 | 4.2 | 4380 |
| 100 | 6.0 | 24 | 76 | 2.6 | 4480 |

TABLE VI

| Hydration Conditions | | | Extrusion Conditions | | Guar Gum Evaluation | | |
| --- | --- | --- | --- | --- | --- | --- | --- |
| Water (% on splits) | Time (hr) | Temp. (°C.) | Screw Speed (RPM) | Feeder Setting | Through 100 mesh (%) | Moisture Content (%) | Viscosity (cps) |
| 100 | 1 | 5 | 900 | 15 | 70 | 3.0 | 4600 |
| 100 | 1 | 5 | * | * | 68 | 3.8 | 4500 |
| 100 | 1 | 24 | 900 | 15 | 81 | 3.0 | 4960 |
| 100 | 1 | 24 | * | * | 60 | 2.2 | 4480 |
| 100 | 1 | 80 | 900 | 15 | 75 | 6.8 | 4220 |
| 100 | 1 | 80 | * | * | 72 | 12.0 | 4080 |
| 100 | 1 | 95 | 900 | 15 | 75 | 7.0 | 4440 |
| 100 | 1 | 95 | * | * | 69 | 7.8 | 4000 |

*Not extruded (control)

TABLE VII

| Hydration Conditions | | | Extrusion Conditions | | Guar Gum Evaluation | | |
| --- | --- | --- | --- | --- | --- | --- | --- |
| Water (% on splits) | Time (hr) | Temp. (°C.) | Screw Speed (RPM) | Feeder Setting | Through 100 mesh (%) | Moisture Content (%) | Viscosity (cps) |
| 15 | 1 | 24 | — | — | — | — | a. |
| 25 | 1 | 24 | 900 | 10 | 87 | 7.0 | 3640 |
| 25 | 1 | 24 | * | * | 82 | 8.8 | 3000 |
| 35 | 1 | 24 | — | — | 88 | 10.0 | 3920 |
| 50 | 1 | 24 | 900 | 15 | 88 | 8.4 | 4860 |
| 50 | 1 | 24 | * | * | 81 | 8.8 | 3760 |
| 100 | 1 | 24 | 900 | 20 | 79 | 6.4 | 5080 |
| 100 | 1 | 24 | * | * | 60 | 2.2 | 4480 |
| 200 | 1 | 24 | 900 | 20 | 45 | 2.4 | 5160 |
| 200 | 1 | 24 | * | * | 45 | 2.0 | 4820 |
| 300[b.] | 1 | 24 | 900 | 15 | 44 | 3.4 | 4600 |

[a.] Extruder jammed
[b.] Die used was ⅛ in (0.3 cm) instead of 0.2 in (0.5 cm) die
*Not extruded (control)

The results show that the optimum hydration conditions are 24° to 80° C. for 0.5 to 2.0 hrs using 75 to 125% water on splits, preferably 24° C. for 1 hr using 100% water. The viscosity increased with increasing hydration temperatures up to about 80° C. beyond which point high temperatures led to a decrease in the viscosity-producing properties of the resulting gums. Lower viscosities were obtained with both shorter and longer hydration times.

Further the viscosity increases resulting from increased water levels were offset by the difficulty of handling, grinding, and drying splits hydrated using water levels above 150% and by the reduction in ground product yield that would pass through 100 mesh screen when water levels above 100% were used. One approach to this handling problem was to reduce the moisture content of the extruded splits from 77.5% (300% water on splits) to 63% by hot air drying in the Dietert dryer, followed by grinding in the Mikro-Pulverizer Bantam hammermill and further drying of the ground gum to 2.7% moisture. The viscosity of an aqueous sol prepared from the resulting gum was 4350 cps (52% through 100 mesh).

The results also show that the extruded guar gums always have higher viscosities than the non-extruded control guar gums even when the hydration conditions are varied and are not the optimum.

EXAMPLE IV

This example demonstrates that extrusion, even under varying extruder conditions which were not the optimum attainable, still produces gums with improved viscosity-producing properties.

A 10 lb (4.6 kg) batch of guar splits were hydrated with an equal amount of water (100% on splits) by stirring in a Hobart mixer until all the free water was absorbed and then held in a plastic bag, without agitation, for a total of 1 hr. The hydrated splits were extruded using the Bonnot 2¼ in extruder described in Example I. The extrudate was ground in the Mikro-Pulverizer Bantam hammermill and dried as before in the Dietert hot air dryer. Three variables in the extruder operation were examined.

Using a 8:1 compression ratio screw, the screw speed was varied from 75 to 220 RPM. Aqueous sols prepared from the resulting gums had essentially the same viscosity, i.e. about 4800 cps—a 17.6% increase over the 4080 cps viscosity of a non-extruded control gum.

Screw compression was then varied both with and without the ⅜ in (0.95 cm) die. The viscosities of aqueous sols prepared from the resulting gums are given in Table VIII.

TABLE VIII

| Extrusion Conditions | | Guar Gum Evaluation (<100 mesh) | |
|---|---|---|---|
| Screw Compression (ratio) | Die (in) | Average Viscosity (cps) | Viscosity Increase* (%) |
| 8:1 | ⅜ | 4820 | 18.1 |
| 8:1 | none | 4640 | 13.7 |
| 4:1 | ⅜ | 4923 | 20.7 |
| 4:1 | none | 4980 | 22.1 |
| 2:1 | ⅜ | 4600 | 12.7 |

*Percentage increase in viscosity over the non-extruded control gum

The results show that extrusion always improves the viscosity-producing properties of the resulting gums even when no die is present.

EXAMPLE V

This example demonstrates that the extrudate should be ground while wet.

Guar splits were processed in the same manner as in Example III using the Wenger X-5 laboratory model extruder. The splits were hydrated with 100% water on splits for 1 hr at 24° C. They were extruded through a 0.2 in (0.51 cm) die; outlet temperature was 52° C. The splits were dried to 7.4% moisture in the Dietert dryer before grinding in the Mikro-Pulverizer Bantam hammermill.

The viscosity of an aqueous sol prepared from the resulting gum was only 2720 cps compared with an average viscosity of 5000 cps for 2 guar split batches similarly processed, but where the extrudate was not dried before grinding. The percentage passing through 100 mesh was not significantly different (85.6% for the dry-ground gum vs. 76.5% for the wet-ground gum).

EXAMPLE VI

This example shows that the hydrated splits may be held for up to 24 hours after extrusion without impairing the viscosity-producing properties of the resulting gums.

A series of guar split batches were processed as in Example III using the Wenger X-5 laboratory model extruder. The splits were hydrated with 100% water on splits for 1 hr at 24° C. They were extruded through a 0.2 in (0.51 cm) die and then held wet for from 0 to 72 hrs before grinding in the Mikro-Pulverizer Bantam hammermill. The extrudates were dried as before in the Dietert dryer.

The viscosities of aqueous sols prepared from the resulting gums are compared in Table IX.

TABLE IX

| Time between Extrusion and Grinding (hr) | Guar Gum Evaluation (<100 mesh) | |
|---|---|---|
| | Moisture Content (%) | Viscosity (cps) |
| 0 | 8.0 | 4620 |
| 24 | 6.2 | 4520 |
| 48 | 4.0 | 4240 |
| 72 | 8.0 | 3880 |

EXAMPLE VII

This example demonstrates that sorting, used in our usual testing procedure for comparison of the viscosity values, is not necessary and that extrusion improves the viscosity-producing properties of the resulting unsorted gum.

Guar split batches were processed as in Example III using the Wenger X-5 laboratory model extruder with a 0.2 in (0.508 cm) die. They were hydrated with 100% water on splits for 1 hr at 24° C. They were ground in the Mikro-Pulverizer Bantam hammermill and dried as before in the Dietert dryer. One control batch was ground directly after hydration and one batch was extruded after hydration and then ground. A portion of both batches were screened through 100 mesh for comparison with the unscreened sample containing particles larger than 100 mesh.

The viscosities of aqueous sols prepared from the resulting gums are compared in Table X.

TABLE X

| Extrusion Conditions | Guar Gum Evaluation | | |
|---|---|---|---|
| | | Screened | |
| Die Diameter (in) | Unscreened | (100 mesh) (% through) | Viscosity (cps) |
| 0.2 | X | — | 5060 |
| 0.2 | — | 79 | 5080 |
| * | X | — | 3820 |
| * | — | 63 | 4240 |

*Not extruded (control)

The results show that the screened gum had a viscosity slightly higher than the unscreened gum and that extrusion considerably improved the viscosity even when the product was not screened. It should be noted that the unscreened gum will usually have a lower viscosity.

EXAMPLE VIII

This example compares the viscosity evaluation procedure used in this specification with the viscosity evaluation procedure described in U.S. Pat. No. 2,891,050 (Example III), i.e. patent which describes the flaking (flattening) process of the prior art.

The viscosities of some of the guar gums prepared in Example I were compared using the two evaluation procedures. Aqueous sols were prepared and evaluated using the procedure described in detail in this specification (prior to the Examples) and the procedure of U.S. Pat. No. 2,891,050. In that patent, a 5.00 g (D.B.) sample was added to 500 ml distilled water, mixed for 2 min using a Waring Blender set up so that the vortex extended to about ½ of the water depth, held for 13 min, and measured using the Brookfield Viscometer with the #3 spindle at 20 RPM after 5 revolutions had been made. The viscosities are compared in Table XI.

TABLE XI

| | | Evaluation | | |
|---|---|---|---|---|
| | | Viscosity (cps) (<100 mesh) | | |
| | Moisture Content | Procedure of this | Procedure of prior art[a] | |
| Guar Gum | (%) | process | (#3 spindle) | (#4 spindle) |
| IA | 8.8 | 5280 | >5000 | 5250 |
| IG | 10.4 | 5640 | >5000 | 5650 |
| I-Control* | 14.8 | 4420 | 2985 | 2970 |

[a] Since the reading with the #3 spindle was off scale, a #4 spindle at 20 RPM was used.
*Control was non-extruded gum.

The results show that the viscosity improvement was due to extrusion and not to the evaluation procedure used and that the values were much higher than those reported in U.S. Pat. No. 2,891,050 for the flaking (flattening) method, i.e. 1025–2400 cps.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. A process for preparing a guar gum from guar splits, which comprises the steps of:
    a. hydrating guar splits with water at about 5° to 95° C. for at least 0.25 hour whereby the total moisture content of said guar splits is increased to about 25 to 80% by weight;
    b. extruding said hydrated guar splits by passage through an extruder having an elongated cylindrical barrel provided with an inlet opening, a die opening at the outlet end of said barrel, and a screw rotatable within said barrel to transport and work said guar splits; and
    c. grinding said hydrated and extruded guar splits.

2. The process of claim 1, further comprising the step of drying said ground guar gum to a moisture content of less than 20% by weight.

3. The process of claim 2, wherein said drying step is carried out in a flash dryer.

4. The process of claim 2, wherein said drying step is carried out for about 10–15 minutes using hot air at about 100°–125° C.

5. The process of claim 1, wherein said guar splits are hydrated to a total moisture content of about 50 to 60% by weight.

6. The process of claim 1, wherein said hydration step is carried out at about 20° to 80° C. over a period of time ranging from about 0.5 to 2 hours.

7. The process of claim 1, wherein said hydration step is carried out at ambient temperature for about 1 hour.

8. The process of claim 1, wherein said splits are agitated during said hydration step.

9. The process of claim 1, wherein said hydrated guar splits are held for from 0.5 to 2 hours after all of the water has been absorbed by said guar splits during said hydration step.

10. The process of claim 1, wherein said hydrated and extruded splits are ground to a finely divided state.

* * * * *